(12) United States Patent
Woodward

(10) Patent No.: US 10,227,247 B2
(45) Date of Patent: *Mar. 12, 2019

(54) METHODS AND SYSTEMS FOR REMEDIATION OF HEAVY METALS IN COMBUSTION WASTE

(71) Applicant: Big Monkey Services, LLC, Evanston, WY (US)

(72) Inventor: Brian C. Woodward, Evanston, WY (US)

(73) Assignee: BIG MONKEY SERVICES, LLC, Evanston, WY (US)

( * ) Notice: Subject to any disclaimer, the term of this patent is extended or adjusted under 35 U.S.C. 154(b) by 272 days.

This patent is subject to a terminal disclaimer.

(21) Appl. No.: 15/165,751

(22) Filed: May 26, 2016

(65) Prior Publication Data

US 2017/0341963 A1 Nov. 30, 2017

(51) Int. Cl.
*C02F 3/34* (2006.01)
*B01D 53/84* (2006.01)
(Continued)

(52) U.S. Cl.
CPC ............ *C02F 3/341* (2013.01); *B01D 53/502* (2013.01); *B01D 53/64* (2013.01); *B01D 53/84* (2013.01);
(Continued)

(58) Field of Classification Search
CPC ...... C02F 3/341; C02F 3/348; C02F 2101/22; C02F 2101/106; C02F 2101/103; C02F 2101/20; C02F 2103/18; B01D 53/502; B01D 53/64; B01D 53/84; B01D 53/83; B01D 53/75; B01D 2257/60; B01D 2257/302; B01D 2257/206; B01D 2257/2045; B01D 2258/0291;
(Continued)

(56) References Cited

U.S. PATENT DOCUMENTS 4,834,955 A   5/1989   Mouche
6,056,934 A   5/2000   Carlsen et al.
(Continued)

OTHER PUBLICATIONS

Nolan, Paul S., "Flue Gas Desulfurization Technologies for Coal-Fired Power Plants," Presented at the Coal-Tech 2000 International Conference, Nov. 13-14, 2000, Jakarta Indonesia, 13 pages.
(Continued)

*Primary Examiner* — Michael L Hobbs
(74) *Attorney, Agent, or Firm* — Workman Nydegger

(57) ABSTRACT

Methods and systems for bioremediation of heavy metal contaminants in waste materials (e.g., sludge and combustion wastes from a coal-fired power plant). The systems described in the present application include at least one waste treatment unit (e.g., a flue gas cleaner or a waste lagoon) that includes one or more selected bacterial strains disposed therein consume and/or reclaim at least a portion of the heavy metal in the combustion wastes. Methods include inoculating a waste treatment unit with one or more selected bacteria that consume and/or reclaim at least a portion of the heavy metal in the combustion wastes. Methods may include periodic reinoculation of the waste treatment unit with fresh bacteria and period recovery of the bacteria from the waste treatment unit.

13 Claims, 3 Drawing Sheets

(51) Int. Cl.
    *B01D 53/50*     (2006.01)
    *B01D 53/64*     (2006.01)
    *C02F 101/22*     (2006.01)
    *C02F 101/10*     (2006.01)
    *C02F 101/20*     (2006.01)
    *C02F 103/18*     (2006.01)
    *B01D 53/75*     (2006.01)
    *B01D 53/83*     (2006.01)

(52) U.S. Cl.
CPC .............. *B01D 53/75* (2013.01); *B01D 53/83* (2013.01); *B01D 2251/304* (2013.01); *B01D 2251/402* (2013.01); *B01D 2251/404* (2013.01); *B01D 2251/604* (2013.01); *B01D 2251/606* (2013.01); *B01D 2251/95* (2013.01); *B01D 2253/102* (2013.01); *B01D 2257/206* (2013.01); *B01D 2257/2045* (2013.01); *B01D 2257/302* (2013.01); *B01D 2257/60* (2013.01); *B01D 2258/0283* (2013.01); *B01D 2258/0291* (2013.01); *C02F 3/348* (2013.01); *C02F 2101/103* (2013.01); *C02F 2101/106* (2013.01); *C02F 2101/20* (2013.01); *C02F 2101/22* (2013.01); *C02F 2103/18* (2013.01); *Y02A 50/2358* (2018.01)

(58) Field of Classification Search
CPC ...... B01D 2258/0283; B01D 2251/606; B01D 2251/604; B01D 2251/404; B01D 2251/402; B01D 2251/304; B01D 2251/95; B01D 2253/102
USPC ................... 435/290.1–290.4, 262.5; 47/1.4
See application file for complete search history.

(56) References Cited

U.S. PATENT DOCUMENTS

| | | | |
|---|---|---|---|
| 6,056,937 | A | 5/2000 | Carlsen et al. |
| 6,656,249 | B1 | 12/2003 | Buisman et al. |
| 7,060,233 | B1 | 6/2006 | Srinivas et al. |
| 7,325,603 | B2 | 2/2008 | Kotlar |
| 7,531,159 | B2 | 5/2009 | Lanning et al. |
| 8,070,863 | B2 | 12/2011 | Tsangaris et al. |
| 8,306,665 | B2 | 11/2012 | Tsangaris et al. |
| 8,353,980 | B2 | 1/2013 | Murphy |
| 8,372,169 | B2 | 2/2013 | Tsangaris et al. |
| 8,413,967 | B2 | 4/2013 | Johnson et al. |
| 8,690,975 | B2 | 4/2014 | Tsangaris et al. |
| 10,046,274 | B2 * | 8/2018 | Woodward ............... F23J 15/04 |
| 2007/0092962 | A1 | 4/2007 | Sheppard |
| 2012/0115201 | A1 | 5/2012 | Adams |
| 2015/0125901 | A1 | 5/2015 | Razavi-Shirazi et al. |
| 2017/0056822 | A1 | 3/2017 | Woodward |

OTHER PUBLICATIONS

Mortson, Murray, et al., "Flue Gas Desulfurization Using Recycled Sodium Bicarbonate," Presented at the US EPA/DOE/EPRI Combined Power Plant Air Pollutant Control Symposium: "The Mega Symposium," on Aug. 20-23, 2001, Chicago, IL, US, 6 pages.

"Flue-Gas Desulfurization," Wikipedia, the free encyclopedia, Accessed Jan. 29, 2015 at https://en.wikipedia.org/wiki/Flue-gas_desulfurization 8 pages.

"Naughton Plant," PacfiCorp, Jan. 2011, 2 pages.

Srivastava, R.K., et al., "Flue Gas Desulfuization: The State of the Art," Journal of Air and Waste Management Association, Dec. 2001 vol. 51, pp. 1676-1688.

U.S. Appl. No. 15/437,662, filed Feb. 21, 2017, Woodward.

Sun, et al. Abstract of "Study on Sale Inhibition Properties of Gama-PGA," Journal of East China Normal University, May 2010, 3 pages.

Office Action for U.S. Appl. No. 14/839,037 dated Nov. 17, 2017, 17 pages.

Carrieri et al. "Enhancing Photo-Catalytic Production of Organic Acids in the Cyanobacterium *Synechocystis* sp. PCC 6803 ΔgIgC, a Strain Incapable of Glycogen Storage" Microb. Biotechnol, Mar. 2015; 8(2): 275-280.

U.S. Appl. No. 15/437,662, Jan. 24, 2019, Office Action.

* cited by examiner

METHODS AND SYSTEMS FOR REMEDIATION OF HEAVY METALS IN COMBUSTION WASTE

BACKGROUND

In the combustion of fossil fuels, which is carried out with the aim of energy recovery, and in the incineration of refuse, sewage sludge and industrial waste, which is carried out with the aim of waste disposal and energy recovery, flue gases are formed that are contaminated by heavy metals, heavy-metal compounds, and other pollutants (e.g., ash, $SO_2$, $SO_3$, and the like). The contaminants are present in the flue gas in different amounts depending on the particular combustion process, and the concentration of the contaminants undergoing certain variations during each combustion process. For example, the different and varying composition of refuse, industrial waste and sewage sludge means that the flue gases formed on combustion of this waste are contaminated by different amounts of environmentally polluting substances present in the starting material. However, all contaminants must be substantially removed from the flue gases before the latter can be released into the atmosphere, since very many contaminants exert toxic effects on humans, animals and plants even in low concentration.

Flue gases are treated with a variety of devices to remove pollutants before the gas is introduced into the air. Solids (e.g., fly ash) are typically removed by electrostatic precipitators and in so-called baghouses, while liquid contact scrubbers remove gaseous and volatile wastes from the flue gas before it is discharged. For example, while flue gas desulfurization units are specifically designed to remove gaseous sulfur compounds (e.g., $SO_2$ and $SO_3$) from flue gas, the contact liquid traps many pollutants like heavy metals. Trapped solids and contaminated liquid wastes are typically disposed of in pits and/or waste lagoons. The approximately 1.05 billion tons of coal burned each year in the United States contain significant amounts of toxic wastes. On top of emitting 1.9 billion tons of carbon dioxide each year, coal-fired power plants in the United States also create 120 million tons of waste each year. That means each of the nation's ~500 coal-fired power plants produces an average 240,000 tons of waste each year. A power plant that operates for 40 years will leave behind ~9.6 million tons of waste.

Many of the heavy metals that are released as products of combustion from power plant, incinerators, and the like are environmentally and biologically toxic elements, such as lead, mercury, nickel, tin, cadmium, antimony, and arsenic. Waste that is stored in ponds or pits can present health and environmental risks if released into ground water. Mercury, for instance, is a persistent environmental pollutant that is trapped by organisms at the low end of the food chain and concentrated by organisms, such as fish and birds, higher up the food chain. When fish and animals eat these microorganisms, the toxins accumulate and can interfere with reproduction, growth, and behavior, and can even cause death. According to the Centers for Disease Control and Prevention, in 2003 eight percent of American women of childbearing age had unsafe levels of mercury in their blood, putting approximately 322,000 newborns at risk of neurological deficits. Mercury exposure also can lead to increase cardiovascular risk in adults.

There exists a need in the art for more effective means for remediation of heavy contaminants present in combustion wastes.

SUMMARY

Described herein are methods and systems for bioremediation of heavy metal contaminants in waste materials (e.g., sludge and combustion wastes from a coal-fired power plant). Heavy metal contaminants are present in all combustion wastes. When those wastes are accumulated on an industrial scale, the heavy metals present in the waste can act as a significant source of run-off and ground water heavy metal contamination. The systems described in the present application include at least one waste treatment unit (e.g., a flue gas cleaner or a waste lagoon) that includes one or more selected bacterial strains disposed therein consume and/or reclaim (e.g., change the chemical state of, recombine, render inert, detoxify, or the like) at least a portion of the heavy metals in the combustion wastes. Methods include inoculating a waste treatment unit with one or more selected bacteria that consume and/or reclaim at least a portion of the heavy metal in the combustion wastes. Methods may include periodic reinoculation of the waste treatment unit with fresh bacteria, and periodic recovery of the bacteria from the waste treatment unit.

In an embodiment, a system is disclosed. The system includes at least one waste treatment unit (e.g., a liquid-gas contact flue gas treatment unit or a waste lagoon) and a bacterial strain disposed in the at least one waste treatment unit. The bacterial strain is adapted to grow in the waste treatment unit and to remediate heavy metals contamination therein. In one embodiment, the system may be used to treat both wet and dry wastes that contain heavy metals. The liquid in a liquid-gas contact flue gas treatment unit naturally contains water and other nutrients and is amenable to the growth and proliferation of the selected bacterial strain. Dry or partially dry combustion wastes (e.g., waste from one or more of a coal sludge, the liquid-gas contact flue gas treatment unit, a hot-side electrostatic precipitator, a cold-side electrostatic precipitator, a fabric filter, a bag house, a particle scrubber, or a spray dryer absorber system) are also contaminated with significant amounts of heavy metals and can be treated with the system described herein. Such wastes may be hydrated before disposing of them in a waste lagoon and inoculated with the bacterial strain.

In another embodiment, a method for bioremediation of heavy metals contamination in a waste material is disclosed. The method includes providing at least one waste treatment unit (e.g., a liquid-gas contact flue gas treatment unit or a waste lagoon), preparing an inoculum that includes a bacterial strain adapted to grow in the at least one waste treatment unit and to remediate heavy metals contamination therein, and inoculating the at least one waste treatment unit with a first amount of the inoculum such that the bacteria are present therein to consume and reclaim heavy metals contained in the at least one waste treatment unit. In one embodiment, the inoculum has a selected volume and a selected bacterial cell density in a range of 0.01 weight % (wt %) to 10 wt %.

In another embodiment, a method for bioremediation of heavy metals contamination in a waste material is disclosed. The method includes providing at least one waste treatment unit selected (e.g., a liquid-gas contact flue gas treatment unit or a waste lagoon, preparing a bacterial inoculum that includes at least one a bacterial, proteobacterial, or archaeal species adapted to grow in the at least one waste treatment unit and to remediate heavy metals contamination therein, inoculating the at least one waste treatment unit with a first amount of the bacterial inoculum, mixing the bacterial inoculum and the contents of the waste treatment unit such that the bacteria can multiply therein to consume and reclaim heavy metals contained in the at least one waste treatment unit, and reinoculating the at least one waste treatment unit with at least a second amount of the inoculum, wherein the reinoculating occurs in a range of daily to weekly.

In some embodiments, the above described methods may further include removing the waste material and the bacteria from the at least one waste treatment unit, drying the waste material and the bacteria, and burying the dried waste material and the bacteria in a dry waste disposal unit. In some embodiments, the above described methods may further include allowing the bacteria to proliferate in the at least one waste treatment unit for one or more of a selected period of time, to a selected cell density, or to a selected degree of free heavy metals reduction, recovering the bacteria from the at least one waste treatment unit, and recovering the heavy metals from the bacteria. Such methods may further include recharging the at least one waste treatment unit with fresh waste material, and reinoculating the at least one waste treatment unit with a fresh bacterial inoculum.

In a preferred embodiment of the above describes systems and methods the bacterial inoculum comprises at least one of *Bacillus subtilis, Bacillus chitinosporus, Bacillus amyloliquefaciens, Bacillus licheniformis*, and variants thereof.

These and other objects and features of the present invention will become more fully apparent from the following description and appended claims, or may be learned by the practice of the invention as set forth hereinafter.

DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
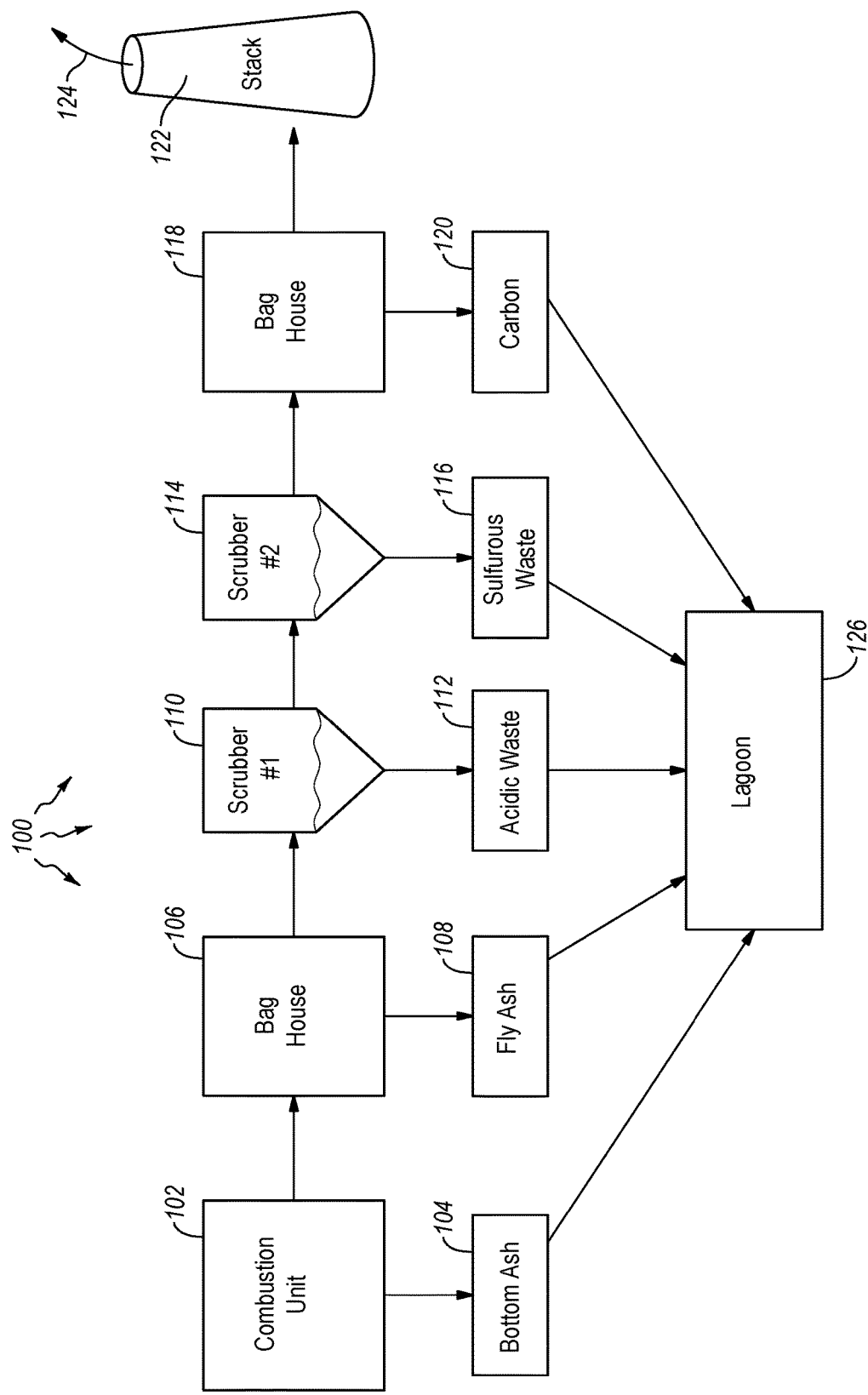
FIG. 1 is a schematic illustration of a power plant with a flue gas treatment system that includes dry and liquid waste recovery systems, according to one embodiment of the present disclosure.

Described herein are methods and systems for bioremediation of heavy metal contaminants in waste materials (e.g., sludge and combustion wastes from a coal-fired power plant). Heavy metal contaminants are present in all combustion wastes. When those wastes are accumulated on an industrial scale, the heavy metals present in the waste can act as a significant source of run-off and ground water heavy metal contamination. The systems described in the present application include at least one waste treatment unit (e.g., a flue gas cleaner or a waste lagoon) that includes one or more selected bacterial strains disposed therein consume and/or reclaim (e.g., change the chemical state of, recombine, render inert, detoxify, or the like) at least a portion of the heavy metals in the combustion wastes. Methods include inoculating a waste treatment unit with one or more selected bacteria that consume and/or reclaim at least a portion of the heavy metal in the combustion wastes. Methods may include periodic reinoculation of the waste treatment unit with fresh bacteria, and periodic recovery of the bacteria from the waste treatment unit.

I. INTRODUCTION

Heavy metals from human and industrial activities are a significant source of environmental pollution. These heavy metals are persistent environmental pollutants. Sources of heavy metal pollution include, but are not limited to, coal fired power plants, medical waste incinerators, garbage incinerators, waste-to-energy facilities, the mining and smelting of ores, effluent from storage batteries and automobile exhaust, and the manufacturing and inadequate use of fertilizers, pesticides, and many others. The heavy metals and metalloids most commonly found in the environment include, but are not limited to, lead, chromium, mercury, uranium, selenium, zinc, arsenic, cadmium, silver, gold, and nickel. These metals are the subject of concern due to their high toxicity. Apart from being hazardous to human health, they also have an adverse effect on the fauna and flora, and they are not biodegradable in nature. Thus, there is a need to seek new approaches in developing methods and systems to minimize or even eliminate metals present in the environment.

The term "heavy metal" generally refers to metallic elements with an atomic weight higher than that of Fe (55.8 g/mol) or density greater than 5.0 g/cm$^3$, and these metals are naturally present in the environment. However, some metals with an atomic weight lower than that of Fe, for example, Cr, and others that are considering metalloids, such as As and Se, are also commonly referred to as heavy metals. Heavy metals can play a role as micronutrients, such as Cu, Fe, Mn, Mo, Zn, and Ni, but they can also be toxic to humans, e.g., Hg, Pb, Cd, Cu, Ni, and Co, depending on the exposure levels.

Contamination by heavy metals causes many deleterious effects, which affect not only fauna and flora but also human health. Heavy metal ions have a strong electrostatic attraction and high binding affinities with the same sites that essential metal ions normally hind to in various cellular structures, causing destabilization of the structures and biomolecules (e.g., cell wall enzymes, DNA and RNA), thus inducing replication defects and consequent mutagenesis, hereditary genetic disorders, and cancer. Heavy metals are notable contaminants because they are toxic, nonbiodegradable in the environment, and easily accumulated in living organisms. The contamination of waters with heavy metals occurs through natural and anthropogenic activities, mainly related to industrialization.

Heavy metals contaminants can accumulate and persist for long periods of time and may be harmful to vital processes involved in microbial nutrient cycling. The toxicity and mobility of heavy metals are strongly dependent on their chemical form and specific binding properties. Changes in the environmental conditions in soils, such as acidification and variations in the redox potential, can cause the mobilization of heavy metals from the solid phase to the liquid phase, thereby allowing the potential contamination to the plants grown in these soils. In water bodies, a heavy metal in relatively high concentrations affects the biota due to its toxicity, or it can be bioaccumulated, which increases its effect further along the food chain. The progressive increase in the concentration of a contaminant such as a metal, as it advances in the food chain, is known as biomagnification. This occurs due to the need for a large number of organisms from lower trophic levels to feed a member of a higher trophic level and thus contaminants that cannot be metabolized but are fat soluble can accumulate in the fatty tissues of living organisms.

Several different physicochemical and biological processes are typically employed to remove heavy metals from contaminated wastewater. Conventional physicochemical methods such as electrochemical treatment, ion exchange, precipitation, osmosis, evaporation, and sorption are not cost-effective, and some of them are not environmentally friendly. On the other hand, bioremediation processes show promising results for the removal of metals, even when present in very low concentrations where physicochemical removal methods fail to operate. Bioremediation is defined as a waste management technique that involves the use of organisms to remove or neutralize pollutants from a contaminated site. According to the EPA, bioremediation is a "treatment that uses naturally occurring organisms to break down hazardous substances into less toxic or non-toxic substances."

Bioremediation can be an eco-compatible and economically feasible option. The bioremediation strategy is based on the high metal binding capacity of biological agents, which can remove heavy metals from contaminated sites with high efficiency. In this regard, microorganisms can be considered as a biological tool for metal removal because they can be used to concentrate, remove, and recover heavy metals from contaminated environments. Bioremediation by microorganisms can be useful due to the action of microorganisms on pollutants even when they are present in very dilute solutions, and they can also adapt to extreme conditions. Although the mechanisms associated with metal biosorption by microorganisms are still not well understood, studies show that they play an important role in the uptake of metals and that this action involves accumulation or resistance.

Fossil fuels such as coal and oil contain various heavy metals such as, but not limited to, antimony, arsenic, barium, beryllium, cadmium, chromium, cobalt, copper, lead, magnesium, manganese, mercury, molybdenum, nickel, selenium, silver, strontium, vanadium, and zinc. Likewise, medical and municipal wastes also contain heavy metals. While these levels usually are not high, the problem is that any heavy metals in the combustion mixture will end up going up the stack or into the ash. Most power plants, waste incinerators, waste-to-energy facilities, and the like use various physical and chemical systems to prevent heavy metals from escaping the stack. Most systems employ one or more "bag houses" that remove fly ash and other particulates and that trap a significant percentage of the metal in the flue gas and one or more liquid-gas contactors (e.g., flue gas desulfurization units) that physically and chemically trap most of the remaining heavy metals in the flue gas. Nevertheless, these flue gas cleaning systems leave behind significant amounts of heavy metal contaminated waste fly ash and desulfurization fluid) that must be disposed of properly to avoid contamination of soil and surface and ground waters with heavy metals.

II. SYSTEMS FOR HEAVY METALS REMEDIATION

Referring now to FIG. 1, a power plant 100 with a flue gas treatment system that includes dry and liquid waste recovery systems is illustrated. In the illustrated embodiment, burning of the combustible material produces a variety of dry and wet waste materials that may typically be contaminated with heavy metals. And while the following embodiment is related to a power plant, a waste-to-energy facility, or the like, one will appreciate that any industrial combustion system (e.g., a medical waste incinerator) may generate wastes that may be contaminated with heavy metals and that may benefit from the technologies described herein.

The power plant 100 illustrated in FIG. 1 includes a combustion unit 102 (e.g., a boiler) that is configured for burning combustible materials (e.g., coal, diesel, municipal solid waste, etc.). Burning of the combustible materials can, for example, be linked to the production of steam to drive a turbine for energy recovery from the combustible materials. Downstream of the combustion unit 102, a power plant, a waste-to-energy facility, an incinerator or the like may include one or more waste treatment units that are designed to "clean" the combustion gases going up the flue. However, the combustion unit 102 and each of the flue gas cleaning units leave behind waste materials that may typically be contaminated with heavy metals.

In the system illustrated in FIG. 1, downstream from the combustion unit 102 there is a first bag house 106. A baghouse is an air pollution control device that removes particulates out of air or gas released from commercial processes or combustion for electricity generation by passing the flue gas through long fabric filter tubes. The first stage of pollution control at a power plant like plant 100 may include and electrostatic precipitator instead of a bag house. However, unlike electrostatic precipitators, where performance may vary significantly depending on process and electrical conditions, functioning baghouses typically have a particulate collection efficiency of 99% or better, even when particle size is very small.

With conventional filter media, a baghouse may capture up to about 85% of mercury in the flue gas. Capture rates may be increased up to a range of 95-98% by the injection of sorbent (e.g., powdered activated carbon) into the flue gas and/or through the use of special high surface area filter media. Other metals may be trapped as well. In any case, the ash and other particulates trapped in the baghouse 106 and the filter media are likely contaminated with a variety of heavy metals.

Downstream from the first baghouse 106, are first and second liquid-gas contact scrubbers 110 and 114 that remove additional pollutants from the flue gas. In the illustrated embodiment, the first scrubber 110 is an acid gas scrubber (e.g., a hydrochloric acid scrubber) that is configured to remove acidic gases from the flue gas and the second scrubber 114 is a flue-gas desulfurization unit (FGD unit) that is designed to remove sulfur dioxide and other sulfurous gases from the flue gas, although other configurations are possible.

As will be explained in greater detail below, the first and second liquid-gas contact scrubbers 110 and 114 clean the flue gas by contacting the gas in the scrubber unit with a liquid medium that is specifically designed to chemically trap certain pollutants (acidic combustion gases or sulfur dioxide). Many heavy metals may also become dissolved or suspended in the liquid contact media.

Downstream from the first and second liquid-gas contact scrubbers 110 and 114 is a second baghouse 118. The second bag house may include a sorbent injection system that allows the baghouse 118 to extract any remaining heavy metals or dioxins out of the flue-gas with the aid of active carbon before the flue gas is released to the stack 122 and vented to the air 124.

One will appreciate that the foregoing is merely descriptive of some of the components of a power plant and is likely oversimplified. A power plant or another facility that produced heavy metal contaminated waste may include more or fewer or different components without departing from the spirit of this description.

While the baghouses 106 and 118 and the scrubbers 110 and 114 are able to filter up to 99% or more of the heavy metals from the flue gas, the combustion and each stage of the flue gas treatment leaves wastes such as, but not limited to, bottom ash 104, fly ash 108, acidic waste 112, sulfurous waste 112 and activated carbon 120 that are contaminated with heavy metals and that need to be treated in order to avoid contaminating the environment. Wastes may also include dry or partially dry wastes from one or more of a coal sludge, a hot-side electrostatic precipitator, a cold-side electrostatic precipitator, a particle scrubber, or a spray dryer absorber system.

As will be explained in greater detail below, some of the wastes may be treated in situ by inoculating the scrubbers 110 and 114 with one or more selected bacterial strains that may remediate (e.g., consume and/or reclaim) the heavy metals captured from the flue gas. In addition or in the alternative, dry and liquid wastes (e.g., one or more of the waste streams 104, 108, 112, 116, and 120) may be pooled in a waste lagoon 126 that may be inoculated with one or more selected bacterial strains that may remediate the heavy metals captured from the flue gas. In addition or alternatively, wastes from liquid-gas contact scrubbers like 110 and 114 may be treated substantially in a waste lagoon. Likewise, liquid wastes that are treated in situ in a scrubber will introduce inoculating bacteria into a waste lagoon when the spent absorption liquid is disposed of in a waste lagoon.

In one embodiment of the present disclosure, bacteria introduced into one or more of the waste treatment systems described above may be allowed to proliferate in the at least one waste treatment unit for a selected period of time (e.g., hours, days, weeks, or months). In the case of the scrubber units described above, bacteria may be allowed to proliferate in the scrubber solution until the solution is spent and the solution is flushed so that it can be replaced with fresh solution.

In one embodiment, bacteria may be allowed to proliferate until they reach a predetermined cell density. In another embodiment, the growth of the bacteria in the at least one waste treatment unit may be monitored (e.g., by testing for viable cells, by monitoring cell density, or by monitoring heavy metal levels and determining if the bacteria are still able to remediate the metals) and, by such means, the health of the culture may be determined. In such a case, proliferation may be allowed to proceed as long as the culture in the at least one waste treatment unit is healthy and, presumably, still able to remediate the metals.

Periodically, bacteria may be recovered from the at least one waste treatment unit and, if desired, the heavy metals may be recovered from the bacteria. It may be desirable to periodically recover the bacteria form the at least one waste treatment unit so that the unit can be inoculated with a fresh bacterial culture or to prevent dead cells from settling, decaying, and releasing the heavy metals that the cells have ingested. Bacteria may be recovered from the at least one waste treatment unit by, for example, filtration or, preferably, by flocculation of the bacteria. Flocculation, which may be accomplished, for example, by adding magnesium salts to the liquid in the at least one waste treatment unit, is an economical and efficient way to recover the bacteria from the at least one waste treatment unit.

In one embodiment of the present disclosure, bacteria and waste material treated and/or stored in a wet form may be recovered, dried, and disposed of in a dry form (e.g., burying the waste in a dry waste storage facility). In such a case, the at least one waste treatment unit may be recharged with fresh waste material and the at least one waste treatment unit may be reinoculated with a fresh bacterial inoculum.

A number of bacterial and archaeal species can be used in the systems and methods described herein. In one embodiment *Rhodococcus*, *Bacillus*, *Pseudomonas*, *Clostridia*, *Burkholderia*, *Proteobacteria* such as *Oceanospirillum*, *Neptunomonas*, *Alcanivorax*, and the like are useful for reclamation of heavy metals in waste materials. In another example, *Acetobacter* sp., *Acidiothiobacillus* sp., Sulfate Reducing Bacterial sp., *Acetobacterium* sp., *Clostridia* sp., *Pseudomonas* sp., *Bacillus* sp., and the like are useful for acid production. And in yet another example, *Halobacterium* is a group of Archaea that contains the genus *Halococcus* and others that have a high tolerance for elevated levels of salinity. Some species of halobacteria have acidic proteins that resist the denaturing effects of salts. *Chromohalobacter* is another species. In addition, species such as *Methanosarcina* sp. *Methanococcus* sp., Sulfate Reducing Bacterial sp., *Acetobacterium*, sp., *Clostridia* sp., *Pseudomonas* sp., *Bacillus* sp. and other microbes (*Micrococcus*, *Achromobacter*, *Flavobacterium*, *Bacterioides*, *Serratia*, *Alcaligenes*, and *Cellulomonas*) have been found in high salt environments that are similar to the environment found in industrial waste treatment systems (e.g., in an FGD unit). In one embodiment, the bacteria used in the systems and methods described herein includes a biosurfactant and/or biofilm producing bacterium. In a preferred embodiment, the bacteria used in the systems and methods described herein are *Bacillus subtilis*, *Bacillus chitinosporus*, *Bacillus amyloliquefaciens*, *Bacillus licheniformis*, and variants thereof.

*Bacillus subtilis* is a Gram-positive, catalase-positive bacterium, found in soil, the gastrointestinal tract of ruminants and humans. A member of the genus *Bacillus*, *B. subtilis* is rod-shaped, and has the ability to form a tough, protective endospore, allowing the organism to tolerate extreme environmental conditions.

*Bacillus chitinosporus* is a bacterium found in soil and root extracts of certain plants. *B. chitinosporus* strains are known primarily for their ability of produce nematicidal and insecticidal active metabolites. See, for example, U.S. Pat. No. 5,733,544.

*Bacillus amyloliquefaciens* is a bacterium closely related to *B. subtilis*. For instance, it was long believed that the *B. amyloliquefaciens* was a subspecies of *B. subtilis*. *Bacillus licheniformis* is a soil bacterium that is also related to *B. subtilis*. As mentioned briefly in the Background section of this application, flue gases typically contain heavy metal pollutants and the scrubber units described herein can trap those heavy metal pollutants. In addition to preventing crystalline buildup in the FGD unit, the inventor in this case has also observed that bacteria such as, but not limited to, *Bacillus subtilis*, *Bacillus chitinosporus*, *Bacillus amyloliquefaciens*, and *Bacillus licheniformis* can be useful for remediating the heavy metals trapped by the FGD unit and rendering them non-toxic to the environment.

The bacterial strains used on the systems and methods described herein may be grown in any conventional growth medium that supports bacterial growth. Examples of suitable broth for culturing *Bacillus* sp., include but are not limited to, a broth composed of peptone, dextrose, yeast extract and malt extract and a broth using the same ingredients as well as proflo cottonseed extract and soy flour. Solid substrates are also suitable for growing *Bacillus* sp., strains. Growth procedures may also be readily scaled up to large fermenters by methods well known in the art.

In one embodiment, the bacterial strain(s) used to remediate heavy metal wastes in the systems described herein may be delivered to the site of use in dry form. Bacteria may be grown and subsequently lyophilized by methods well known in the art. Likewise, the bacterial strain(s) used to remediate heavy metal wastes in the systems described herein may be delivered to the site of use in liquid media. Bacteria may be grown and subsequently stored in liquid media by methods well known in the art.

All microbes require nutrient components, C:N:P:S:vitamins: and others, in specific ratios to grow and metabolize various organics. Any imbalance in these ratios can slow or halt microbial growth. Flue gases containing SOx, NOx, $CO_2$, and other components can provide these nutrients in liquid form or as aerosols. Microbes tolerant to higher salt and ionic strength may be naturally adapted to grow in the solutions that utilize high concentrations of flue gases.

Considerable enhancement of microbial growth and metabolism can be obtained by providing and maintaining the proper microbial population, environmental, and nutrient component balance. For example, with the addition (e.g., staged and/or cyclical addition) of appropriate microbes, nutrients, and environmental adjustment components at various points, significant sequestration of heavy metals is possible.

Referring now to FIGS. 2A and 2B, a liquid-gas contact scrubber 200 is schematically illustrated. This liquid-gas contact scrubber 200 can be an acid gas scrubber (e.g., a hydrochloric acid scrubber), a flue-gas desulfurization unit (FGD unit), or another type of liquid-gas contact scrubber.

The liquid-gas contact scrubber 200 includes a vessel 220 that serves to house the liquid-gas contact scrubber unit. Flue gas 214 enters the vessel 220 through duct 212. The flue gas drifts up through the vessel 220 as depicted at 216; the cleaned flue gas 218 exits the vessel 220 exits the vessel at 222. Prior to exiting the liquid-gas contact scrubber 220, the flue gas, which carries significant water vapor due to the nature of the liquid-gas contact process, may be dewatered by passing through a condensation unit 242. The cleaned flue gas 218 may be discharged directly to the air or be sent for further processing.

As illustrated in FIG. 2A, the vessel 220 includes a reservoir of liquid 224. (e.g., desulfurization agent). The scrubber 200 typically uses a water-based solution to capture pollutants in the flue gas by absorbing the pollutants from the carrier gas stream. The scrubbing liquid 224 typically contains a reactive agent that "neutralizes" the absorbed pollutant. In the case of an acid scrubber, the absorption liquid may contain a base e.g., NaOH) that can neutralize the captured acid. A FGD unit may contain a desulfurization agent that may include calcium carbonate (limestone), calcium-magnesium carbonate (dolomite), calcium oxide, calcium hydroxide $Ca(OH)_2$, sodium carbonate ($Na_2CO_3$), sodium hydroxide (NaOH), magnesium hydroxide ($Mg(OH)_2$), and the like, in an alternative embodiment (not shown), the reservoir of absorption liquid may be essentially external to the vessel/FGD unit 220. In an embodiment of the present disclosure, the absorption liquid may be inoculated with one or more types of bacteria that are adapted to grow in the absorption liquid and to absorb, reclaim, and/or render non-toxic heavy metal wastes from the flue gas that are captured by the scrubber 200.

In any case, the reservoir of liquid 224 is connected to a spray bar 230 and a plurality of sprayers 232 via a first recirculation line 226 and a first recirculation pump 228. As the flue gas 216 rises through the vessel 220, the first recirculation line 226 and a first recirculation pump 228 draw liquid from the reservoir 224 and deliver it to the sprayers 232. The hot, rising flue gas 216 reacts with the chemicals in the liquid (e.g., calcium carbonate) to extract pollutants HCl or $SO_2$) from the from the flue gas. In many liquid-gas contact scrubber units, the absorption liquid is sprayed onto a contact plate 234 that is configured to increase the surface area of contact between the flue gas and the absorption liquid. The contact plate will be discussed in greater detail below in reference to FIG. 2B.

In the illustrated embodiment, the system 200 further includes a presaturation sprayer 240 that pre-contacts the hot flue gas 214 with the absorption liquid prior to the gas entering the vessel 220. The presaturation sprayer 240 is fluidly connected to the reservoir of absorption liquid 224 via a second recirculation line 236 and a recirculation pump 238.

Referring now to FIG. 2B, a spray head 232 and an example of a contact plate 234 that can be used in a liquid-gas contact scrubber to increase the surface area for gas-liquid contact are illustrated in greater detail. The spray head can have a number of possible sizes and configurations depending on the size and capacity of the liquid-gas contact scrubber 220. For instance, at a typical power generation station, a liquid-gas contact scrubber (e.g., a flue gas desulfurization vessel) may be as large as 20-40 feet in diameter and each spray head may be 0.5-1.5 feet in diameter. The presaturation sprayers 240 are similar to the sprayers 232. In a typical liquid-gas contact scrubber 220, the contact plates 234 include a number of screens 250 that may each include hundreds of small holes 252 drilled, punched, or otherwise formed therein. In the illustrated embodiment, the screens 250 are supported by upper 256 and lower 254 supports.

In the illustrated operation, the spray head 232 sprays the contact liquid desulfurization agent) down onto the contact plate 250. As the flue gas flows up through the scrubber vessel 220, the flue gas passes through the holes 252 that are coated with the contact liquid.

Liquid-gas contact scrubbers can be configured for efficient capture heavy metals that are present in the flue gas. Essentially all of the surfaces in the liquid-gas contact scrubbers are saturated with the absorption liquid, and as the metals in the flue gas contact the liquid they tend to become captured in the absorption liquid. When the absorption liquid is no longer effective (e.g., when it is saturated with captured sulfates), the spent liquid in generally disposed of. Since these spent liquids are generally contaminated with heavy metals, such disposal (e.g., in a waste lagoon) may pose a number of problems. In addition, some captured metals are not dissolved, per se, and can be reemitted from the scrubber or waste lagoon. For example, mercury is released from the combustion in a number of forms. Gaseous compounds of $Hg^{2+}$ are generally water-soluble and can absorb in an aqueous absorption liquid of a liquid-gas contact scrubber. However, gaseous $Hg^0$ (i.e., elemental mercury) is insoluble in water and does not absorb in such slurries; therefore, elemental mercury can be remitted in gaseous form.

The systems described herein can address these issues related to heavy metals capture by liquid-gas contact scrubbers by disposing a bacterial strain in the liquid-gas contact scrubber. The bacterial strain (or strains) is adapted to grow in the liquid-gas contact scrubber and to and to absorb, reclaim, and/or render non-toxic heavy metal wastes from the flue gas that are captured by the scrubber. For instance, the bacterial strain may grow and proliferate in the scrubber unit and form a biofilm that is made up of bacteria that absorb, reclaim, and/or render non-toxic heavy metal wastes from the flue gas that are captured by the scrubber. Alternatively or in addition, the bacteria may exist in a slurry in the reservoir of absorption liquid in the scrubber vessel.

Figure 3:
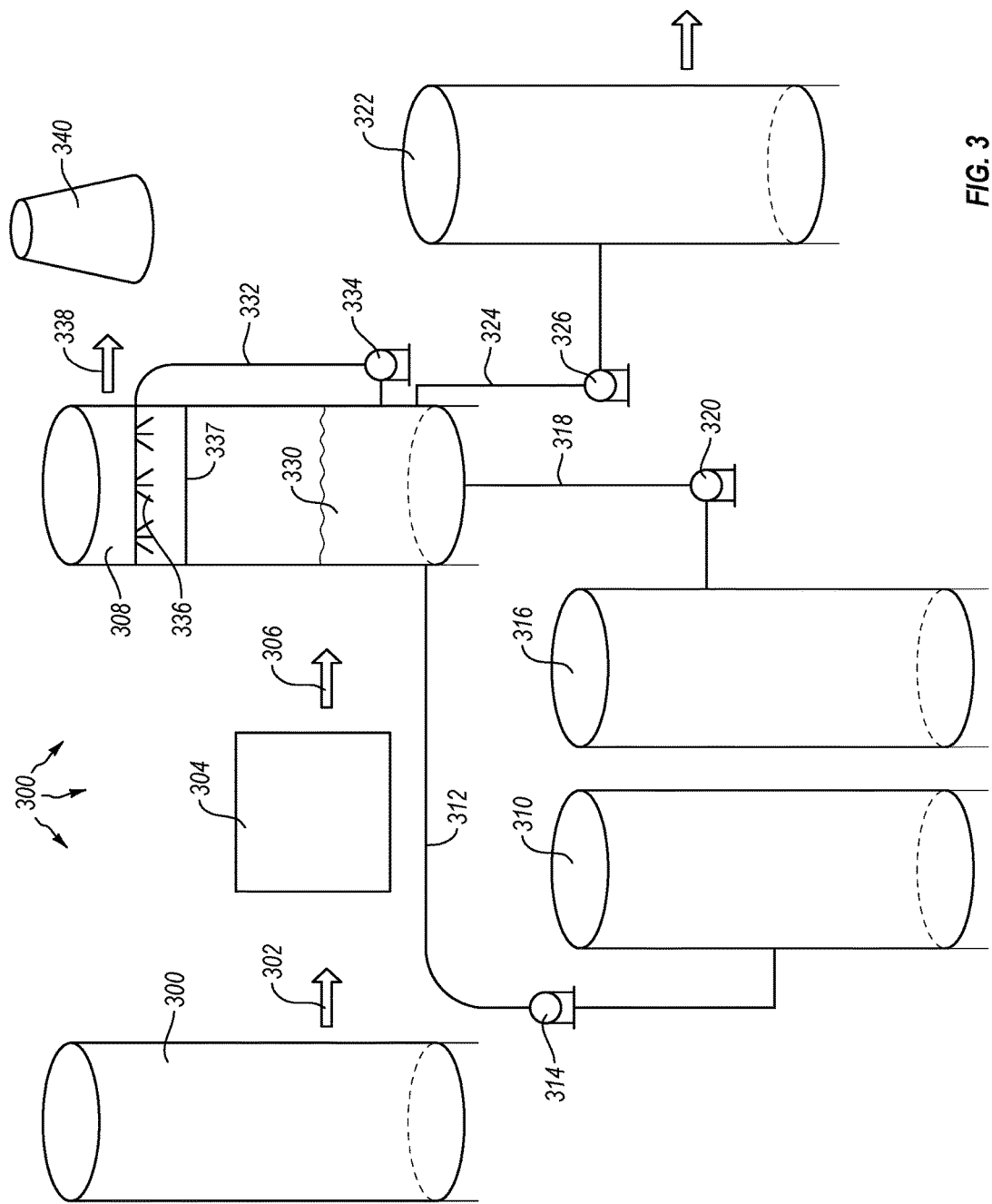
FIG. 3 is a schematic illustration of another liquid-gas contact flue gas treatment unit, according to one embodiment of the present disclosure.

Referring now to FIG. 3, a power generation and/or flue gas-handling unit 300 is illustrated that includes another embodiment of a system for inoculating a waste treatment system with bacteria for absorbing, reclaiming, and/or rendering non-toxic heavy metal wastes. In the illustrated embodiment, the power generation and/or flue gas-handling unit 300 includes a boiler 301. The boiler 301 may burn coal, oil, or another fuel. The boiler 301 produces flue gas 302 that contains heavy metal pollutants that need to be removed downstream before the flue gas is discharged to the air. Particulates (e.g., fly ash) are removed from the flue gas 302 in a particulate precipitator 304 (e.g., an electrostatic precipitator, baghouse, or the like). The flue gas 306 from the precipitator 304 may then be sent to a liquid-gas contact scrubber unit 308. Treated flue gas may be discharged from the liquid-gas contact scrubber unit 308 and sent directly to a discharge stack 340 or to one or more systems for further processing. As will be described in greater detail below, the liquid-gas contact scrubber unit 308 includes systems for absorbing, reclaiming, and/or rendering non-toxic heavy metal wastes.

Figure 2A:
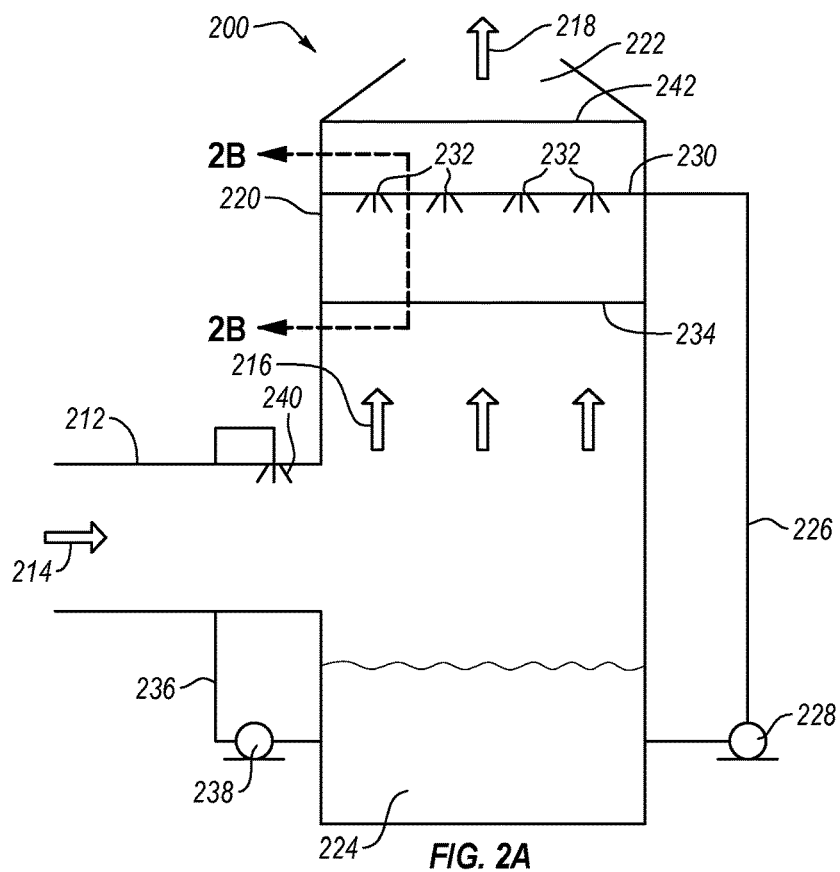
FIGS. 2A-2B illustrate a cutaway view liquid-gas contact flue gas treatment unit, according to one embodiment of the present disclosure.
Figure 2B:
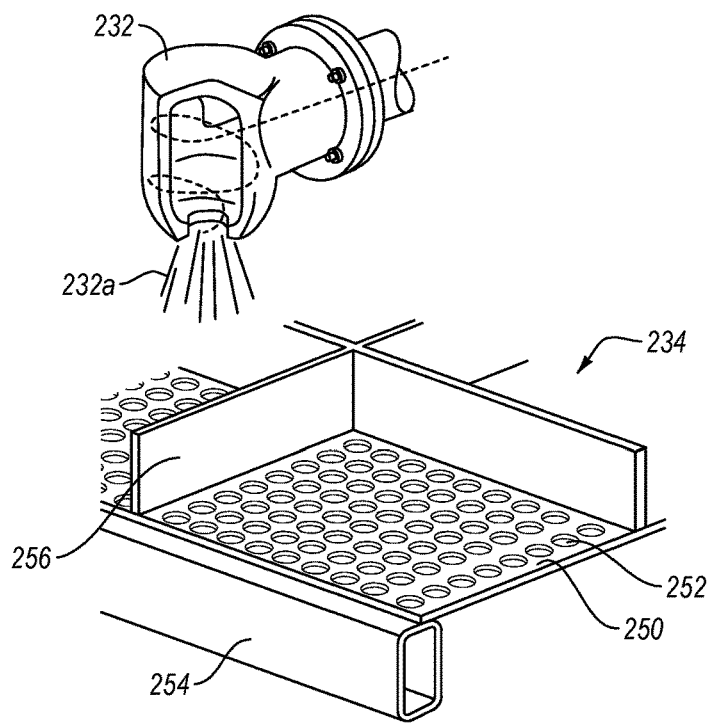

Similar to the systems discussed in reference to FIGS. 2A and 2B, the liquid-gas contact scrubber unit 308 includes a vessel, a reservoir of absorption liquid 330, a recirculating system (i.e., pump 334 and recirculating line 332), sprayers 336, and contact surface 337. In addition, the system 300 includes an external reservoir 310 of absorption liquid that can be used via line 312 and pump 314 to replenish spent absorption liquid in the scrubber 308. Likewise, the system 300 includes an external reservoir 322 that can be used for withdrawing spent absorption liquid from the scrubber 308 via line 324 and pump 326. While the system 300 shows a tank 322, it is understood that the external reservoir for spent desulfurization agent can also include a holding facility such as a pond or waste lagoon.

The system 300 also includes means for inoculating the scrubber 308 with an inoculum that includes one or more bacterial strains that are adapted to grow in the scrubber 308 and remediate the heavy metals therein. In the illustrated embodiment, the means for inoculating the scrubber 308 includes an external holding vessel 316 that is designed to hold the bacteria until they are added to the scrubber unit 308. In addition, the means for inoculating includes a feed system that may include devices for delivering a dry or liquid bacterial preparation to the scrubber 308. In the illustrated embodiment, the feed system includes a feed line 318 that feeds into the reservoir 330 of the scrubber 308 and a feeder 320. In the case of a dry bacterial preparation, the feeder 320 may be screw auger or the like that is configured for "pumping" a dry powder. Likewise, the feeder 320 may be configured to withdraw a dry bacterial preparation from the vessel 316, mix it with aqueous media (e.g., water), and deliver a rehydrated bacterial preparation to the scrubber 308. Alternatively, if the vessel 316 includes liquid bacterial preparation, the feeder 320 may be a pump designed deliver liquid to the scrubber 308.

The feed system (i.e., line 318 and the feeder 320) may be designed to deliver an initial inoculum to the scrubber 308 followed by periodic re-inoculations designed to maintain a population of bacteria in the scrubber 308. Following the initial inoculation, the scrubber 308 may be re-inoculated on a selected schedule. Thus, the feed system may be designed to feed bacteria from the vessel 316 to the scrubber 308 at a selected constant rate or on an hourly, daily, or weekly re-inoculation schedule.

In an embodiment, the feed system (i.e., line 318 and the feeder 320) may be designed to deliver a selected amount of bacteria to the scrubber 308. In one embodiment, the inoculum has a selected volume and a selected bacterial cell density in a range of 0.01 weight % (wt %) to 10 wt %, 0.05 wt % to 5 wt %, 0.1 wt % to 3 wt %, 0.2 wt % to 2 wt %, 0.25 wt % to 1 wt %, or 0.3 wt % to 0.5 wt %. The volume of the inoculum will vary depending on factors such as, but not limited to, the size of the scrubber, the chemistry utilized in the scrubber, the temperature of the flue gas, etc. In a typical scrubber, the initial inoculum may have a volume of about 50-200 gallons (e.g., 100 gallons) of bacterial solution at about 0.2 wt % to 2 wt % (e.g., 0.3 wt %) followed by weekly maintenance doses of about 10-100 gallons (e.g., 50 gallons) of bacterial solution at about 0.2 wt % to 2 wt % (e.g., 0.3 wt %).

III. METHODS FOR BIOREMEDIATION OF HEAVY METALS IN A WASTE MATERIAL

Methods for bioremediation of heavy metals in a waste material (e.g., from a power plant) are described. Methods include providing at least one waste treatment unit (e.g., a liquid-gas contact flue gas treatment unit or a waste lagoon). One will appreciate, however, that the embodiments described in reference to FIGS. 1-3 are merely illustrative and that there are a number of other waste treatment units that are known and in use at industrial facilities (e.g., at power plants) with which the methods described herein can be utilized. Such waste treatment units generally capture heavy metal wastes in an industrial waste stream and will benefit from the methods and systems described herein.

The methods described herein further include preparing an inoculum that comprises a bacterial strain adapted to grow in the at least one waste treatment unit and to remediate heavy metals contamination therein, and inoculating the at least one waste treatment unit with a first amount of the inoculum such that the bacteria are present therein to consume and reclaim heavy metals contained in the at least one waste treatment unit.

In one embodiment, the inoculum has a selected volume and a selected bacterial cell density in a range of 0.01 weight % (wt %) to 10 wt %, 0.05 wt % to 5 wt %, 0.1 wt % to 3 wt %, 0.2 wt % to 2 wt %, 0.25 wt % to 1 wt %, or 0.3 wt % to 0.5 wt %. The volume of the inoculum will vary depending on factors such as, but not limited to, the size of the waste treatment unit, the chemical environment on the waste treatment unit, the temperature of the flue gas, etc. In a typical liquid-gas contact scrubber, the initial inoculum may have a volume of about 50-200 gallons (e.g., 100 gallons) of bacterial solution at about 0.2 wt % to 2 wt % (e.g., 0.3 wt %) followed by weekly maintenance doses of about 10-100 gallons (e.g., 50 gallons) of bacterial solution at about 0.2 wt % to 2 wt % (e.g., 0.3 wt %). The inoculum size appropriate for a waste lagoon may be in the range of hundreds of gallons to thousands of gallons, but will depend on the size of the lagoon and the wastes present in the lagoon.

In one embodiment, the method includes reinoculating the at least one waste treatment unit with at least a second amount of the inoculum. In one embodiment, the reinoculating occurs in a range of daily to weekly. In one embodiment, the inoculum may be provided in a dry form. In such an embodiment, the method may further include mixing the inoculum with an aqueous medium prior to inoculating the at least one waste treatment unit with the inoculum. In another embodiment, the inoculum may be provided in a liquid form wherein the bacterial strain is suspended in an aqueous medium.

In one embodiment, the methods described herein may include removing the waste material and the bacteria from the at least one waste treatment unit and, for example, drying the waste material and the bacteria and burying the dried waste material and the bacteria in a dry waste disposal unit. In another embodiment, the methods described herein may further include allowing the bacteria to proliferate in the at least one waste treatment unit for a selected period of time, recovering the bacteria from the at least one waste treatment unit, and, optionally, recovering the heavy metals from the bacteria. In such embodiment, the methods described herein may include recharging the at least one waste treatment unit with fresh waste material, and reinoculating the at least one waste treatment unit with a fresh bacterial inoculum. Likewise, any one of the waste treatment units described herein may be taken offline for, for example, cleaning, repair, or replacing a waste treatment agent. In such cases, the method may include recharging and reinoculating.

In one embodiment, the bacteria are selected for their ability to grow and proliferate in the at least one waste treatment unit and to consume, reclaim, and/or render non-toxic a variety of heavy metals. In one embodiment, the bacteria in the at least one waste treatment unit may reduce free heavy metal amounts by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 95%, or at least 95%. Heavy metals that may be present in combustion wastes may include, but are not limited to, antimony, arsenic, barium, beryllium, cadmium, chromium, cobalt, copper, lead, magnesium, manganese, mercury, molybdenum, nickel, selenium, silver, strontium, vanadium, and zinc.

In one embodiment, the bacterial strain in the inoculum is at least one a bacterial, proteobacterial, or archaeal species selected from the group consisting of *Rhodococcus*, *Bacillus*, *Pseudomonas*, *Clostridia*, *Burkholderia*, *Oceanospirillum*, *Neptunomonas*, *Alcanivorax*, *Acetobacter* sp., *Acidiothiobacillus* sp., *Acetobacterium* sp., *Clostridia* sp., *Pseudomonas* sp., *Bacillus* sp., *Halobacteria*, *Halococcus*, *Chromohalobacter Methanosarcina* sp., *Methanococcus* sp., *Acetobacterium*, sp., *Clostridia* sp., *Pseudomonas* sp., *Micrococcus*, *Achromobacter*, *Flavobacterium*, *Bacterioides*, *Serratia*, *Alcaligenes*, *Cellulomonas*, and variants thereof. In a preferred embodiment, the bacterial strain comprises one or more of *Bacillus subtilis*, *Bacillus chitinosporus*, *Bacillus amyloliquefaciens*, *Bacillus licheniformis*, and variants thereof.

IV. EXAMPLES

Example 1

Bacterial strains were assayed for their ability to remediate heavy metals in a power plant sludge slurry from a waste lagoon or gas-liquid contact scrubber (e.g., sulfate sludge from a FGD unit). A control and a treatment sample were compared to determine whether a reduction of heavy metals could be demonstrated after microbial addition to the slurry. A microbial treated sample=95 grams sludge slurry+5 grams microbial solution and an untreated control sample=100 grams of sludge slurry only. The microbial solution included *Bacillus amyloliquefaciens* and *Bacillus licheniformis*. The assay methodology was as follows:

Ninety-five grams of the wet sludge material was transferred into a 500 ml beaker;

Five grams of a selected microbial solution was transferred into the beaker and mixed thoroughly with the sludge material to form a homogenous suspension;

The homogenous sample placed into an incubator set to 40° C.;

The mixture was allowed to incubate for at least 12 days with slight stirring every 2 days; and Both the treated and control samples were submitted for heavy metal analysis (e.g., atomic adsorption spectroscopy or atomic emission spectroscopy).

Example 2

Sludge residue originating from power plant waste by-products were treated with specialized heavy metal and sludge remediating bacteria using the same microbes as in Example 1. After allowing for microbial bioremediation, both untreated and treated samples were submitted to independent third party laboratories for a full heavy metals analysis. Inductively Coupled Plasma-Atomic Emissions Spectrometry (ICP-AE) tests were performed to determine the presence and amount of heavy metal in the contaminated sludge before and after treatment with the bacteria. Results are shown below

TABLE 1

Heavy Metal Assay
(Liquid Form; 2015; Untreated Control vs. Microbial Treated)

| Heavy Metals (Total) | Untreated (mg/kg ppm) | Microbial Treated (mg/kg; ppm)* | % Change |
|---|---|---|---|
| Mercury | n.d. | n.d. | — |
| Zinc | 43.5 | 26.1 | −40% |
| Selenium | 3.08 | 1.14 | −63% |
| Lead | 8.6 | 3.1 | −64% |
| Nickel | 10.2 | 4.2 | −59% |
| Molybdenum | 1.1 | n.d. | −100% |
| Cobalt | 3.31 | 1.54 | −53% |
| Cadmium | 0.65 | n.d. | −100% |
| Arsenic | 4.02 | n.d. | −100% |

Analytical Methods: EPA 6010B/7471A (Midwest Laboratories, Inc.)
*Microbial Treatment: Sodium sulfide sludge and carry over residue in a liquid form. Trial duration: 28 days

TABLE 2

Heavy Metal Assay
(SOLID Form; 2015; Untreated Control vs. Microbial Treated)

| Heavy Metals (Total) | Untreated (mg/kg; ppm) | Microbial Treated* (mg/kg; ppm) | % Change |
|---|---|---|---|
| Mercury | 0.02 | n.d. | −100% |
| Barium | 34.8 | 8.12 | −76% |
| Selenium | 6.16 | 1.16 | −81% |
| Lead | n.d. | n.d. | n.d. |
| Silver | n.d. | n.d. | n.d. |
| Chromium | 1.42 | 0.728 | −48% |

TABLE 2-continued

Heavy Metal Assay
(SOLID Form; 2015; Untreated Control vs. Microbial Treated)

| Heavy Metals (Total) | Untreated (mg/kg; ppm) | Microbial Treated* (mg/kg; ppm) | % Change |
|---|---|---|---|
| Cadmium | n.d. | n.d. | n.d. |
| Arsenic | 5.67 | 2.50 | −56% |

Analytical Methods: EPA 6010B/7471A (Chemtech-Ford Laboratories)
*Microbial Treatment: Sodium sulfide sludge and carry over residue in a dry form. Trial Duration: 21 days

TABLE 3

Heavy Metal Assay
(Liquid Form; Scrubber liquid; 2015; Untreated
Control vs. Microbial Treated)

| Heavy Metals (Total) | Untreated (mg/kg; ppm) | Microbial Treated* (mg/kg; ppm) | % Change |
|---|---|---|---|
| Mercury | 0.02 | 0.003 | −85% |
| Barium | 34.8 | 6.27 | −82% |
| Selenium | 6.16 | 5.98 | −3% |
| Lead | n.d. | n.d. | n.d. |
| Silver | n.d. | n.d. | n.d. |
| Chromium | 1.42 | 0.135 | −90% |
| Cadmium | n.d. | n.d. | n.d. |
| Arsenic | 5.67 | 2.66 | −53% |

Analytical Methods: EPA 6010B/7471A (Chemtech-Ford Laboratories)
*Microbial Treatment: Sodium sulfide sludge and carry over residue in a dry form. Trial Duration: 14 days

TABLE 4

Heavy Metal Assay - 12 day reduction

| Analysis | Untreated mg/kg | Treated 12 day mg/kg | % Reduction | Method |
|---|---|---|---|---|
| Mercury | Not Detected | Not Detected | n/a | EPA 7471 |
| Zinc | 43.5 | 26.1 | 40% | EPA 6010 |
| Selenium | 3.08 | 1.14 | 63% | EPA 6010 |
| Lead | 8.60 | 3.10 | 64% | EPA 6010 |
| Nickel | 10.2 | 4.20 | 59% | EPA 6010 |
| Molybdenum | 1.10 | Not Detected | 100% | EPA 6010 |
| Cobalt | 3.31 | 1.54 | 53% | EPA 6010 |
| Cadmium | 0.65 | Not Detected | 100% | EPA 6010 |
| Arsenic | 4.02 | Not Detected | 100% | EPA 6010 |

These data demonstrate that the bacteria described herein are able to remediate heavy metals in the systems and methods described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for bioremediation of heavy metals contamination in a waste material, comprising:
   providing at least one waste treatment unit selected from the group consisting of a liquid-gas contact flue gas treatment unit or a waste lagoon;
   preparing an inoculum that comprises a bacterial strain adapted to grow in the at least one waste treatment unit and to remediate heavy metals contamination therein, wherein the inoculum has a selected volume and a selected bacterial cell density in a range of 0.01 weight % (wt %) to 10 wt %; and
   inoculating the at least one waste treatment unit with a first amount of the inoculum such that the bacteria are present therein to consume and reclaim heavy metals contained in the at least one waste treatment unit.

2. The method of claim 1, further comprising:
   allowing the bacteria to proliferate in the at least one waste treatment unit for a selected period of time;
   recovering the bacteria from the at least one waste treatment unit; and
   recovering the heavy metals from the bacteria.

3. The method of claim 1, wherein the liquid-gas contact flue gas treatment unit, comprises:
   a vessel with a flue gas inlet and a flue gas outlet and a liquid reservoir containing a liquid flue gas treating agent;
   a recirculation/spray system configured to circulate the liquid flue gas treating agent through the vessel;
   one or more contact surfaces in the vessel configured for contacting the flue gas and the liquid flue gas treating agent recirculated from the reservoir; and
   the bacterial strain disposed in the liquid reservoir containing the liquid flue gas treating agent, wherein the bacterial strain is adapted to grow in the liquid flue gas treating agent and to remediate heavy metals trapped from the flue gas therein.

4. The method of claim 3, wherein the liquid-gas contact flue gas treatment unit comprises a flue gas desulfurization unit.

5. The method of claim 1, further comprising adding waste from one or more of a coal sludge, the liquid-gas contact flue gas treatment unit, a hot-side electrostatic precipitator, a cold-side electrostatic precipitator, a fabric filter, a bag house, a particle scrubber, or a spray dryer absorber system to the waste lagoon along with the selected bacterial strain, wherein the selected bacterial strain consumes and reclaims heavy metals contained in the waste added to the waste lagoon.

6. The method of claim 1, wherein the heavy metals contained in the at least one waste treatment unit are selected from the group consisting of antimony, arsenic, barium, beryllium, cadmium, chromium, cobalt, copper, lead, magnesium, manganese, mercury, molybdenum, nickel, selenium, silver, strontium, vanadium, and zinc.

7. The method of claim 1, wherein the bacterial strain reduces free heavy metal amounts in the at least one waste treatment unit by at least 40%.

8. The method of claim 1, wherein the bacterial strain in the inoculum is at least one a bacterial, proteobacterial, or archaeal species selected from the group consisting of *Rhodococcus, Bacillus, Pseudomonas, Clostridia, Burkholderia, Oceanospirillum, Neptunomonas, Alcanivorax, Acetobacter* sp., *Acidiothiobacillus* sp., *Acetobacterium* sp., *Clostridia* sp., *Pseudomonas* sp., *Bacillus* sp., *Halobacteria, Halococcus, Chromohalobacter, Methanosarcina* sp., *Methanococcus* sp., *Acetobacterium*, sp., *Clostridia* sp., *Pseudomonas* sp., *Micrococcus, Achromobacter, Flavobacterium, Bacteroides, Serratia, Alcaligenes, Cellulomonas*, and variants thereof.

9. The method of claim 1, wherein the bacterial strain comprises one or more of *Bacillus subtilis, Bacillus chitinosporus, Bacillus amyloliquefaciens, Bacillus licheniformis*, and variants thereof.

10. The method of claim 1, further comprising reinoculating the at least one waste treatment unit with at least a second amount of the inoculum.

11. The method of claim 10, wherein the reinoculating occurs in a range of daily to weekly.

12. The method of claim 1, the inoculum being provided in a dry form, and wherein the method further comprises mixing the inoculum with an aqueous medium prior to inoculating the at least one waste treatment unit with the inoculum.

13. The method of claim 1, the inoculum being provided in a liquid form wherein the bacterial strain is suspended in an aqueous medium.

* * * * *